(12) United States Patent
Bernstein et al.

(10) Patent No.: US 9,481,410 B2
(45) Date of Patent: Nov. 1, 2016

(54) MAGNETICALLY COUPLED ACCESSORY FOR A SELF-PROPELLED DEVICE

(71) Applicant: Sphero, Inc., Boulder, CO (US)

(72) Inventors: Ian H. Bernstein, Boulder, CO (US); Adam Wilson, Longmont, CO (US); Chun Kong, Hong Kong (HK)

(73) Assignee: Sphero, Inc., Boulder CO ( * ) Notice: Subject to any disclaimer, the term of this patent is extended or adjusted under 35 U.S.C. 154(b) by 0 days.

(21) Appl. No.: 14/968,594

(22) Filed: Dec. 14, 2015

(65) Prior Publication Data

US 2016/0090133 A1     Mar. 31, 2016

Related U.S. Application Data

(63) Continuation of application No. 14/663,446, filed on Mar. 19, 2015, now Pat. No. 9,211,920, which is a continuation of application No. 14/459,235, filed on Aug. 13, 2014, now Pat. No. 9,090,214, which is a (Continued)

(51) Int. Cl.
*B62D 57/00* (2006.01)
*B62D 39/00* (2006.01)

(Continued)

(52) U.S. Cl.
CPC .............. *B62D 39/00* (2013.01); *A63H 30/04* (2013.01); *A63H 33/005* (2013.01); *A63H 33/26* (2013.01); *B60R 11/00* (2013.01); *B62D 11/003* (2013.01);

(Continued)

(58) Field of Classification Search
CPC ..... B60R 11/00; B62D 11/003; B62D 39/00; B62D 61/00; A63H 33/26; A63H 30/04; A63H 33/005; G05D 1/0016; G05D 1/0044; G05D 1/027; G05D 1/0278; G05D 1/0259; G05D 2201/02; Y10S 901/01
USPC .......... 180/7.1, 7.4, 210, 212; 701/99; 901/1
See application file for complete search history.

(56) References Cited

U.S. PATENT DOCUMENTS

| | | | | |
|---|---|---|---|---|
| 3,683,216 A | * | 8/1972 | Post | ....................... H02K 7/025 310/67 R |
| 3,821,995 A | | 7/1974 | Aghnides | |

(Continued)

FOREIGN PATENT DOCUMENTS

| | | |
|---|---|---|
| CN | 201147642 Y | 11/2008 |
| CN | 20120111 | 4/2009 |

(Continued)

OTHER PUBLICATIONS

International Search Report and The Written Opinion of the International Searching Authority mailed Dec. 3, 2012, for related PCT Application No. PCT/US2012/020115 filed Jan. 3, 2012, 11 pages.

(Continued)

*Primary Examiner* — Toan To
(74) *Attorney, Agent, or Firm* — Mahamedi IP Law LLP

(57) ABSTRACT

A system comprising a self-propelled device and an accessory device. The self-propelled device includes a spherical housing, and a drive system provided within the spherical housing to cause the self-propelled device to roll. When the self-propelled device rolls, the self-propelled device and the accessory device magnetically interact to maintain the accessory device in contact with a top position of the spherical housing relative to an underlying surface on which the spherical housing is rolling on.

20 Claims, 5 Drawing Sheets

Related U.S. Application Data continuation-in-part of application No. 14/035,841, filed on Sep. 24, 2013, now Pat. No. 9,193,404, which is a continuation of application No. 13/342,853, filed on Jan. 3, 2012, now Pat. No. 8,571,781.

(60) Provisional application No. 61/430,023, filed on Jan. 5, 2011, provisional application No. 61/430,083, filed on Jan. 5, 2011, provisional application No. 61/553,923, filed on Oct. 31, 2011.

(51) Int. Cl.
| | |
|---|---|
| B60R 11/00 | (2006.01) |
| B62D 61/00 | (2006.01) |
| B62D 11/00 | (2006.01) |
| A63H 30/04 | (2006.01) |
| A63H 33/00 | (2006.01) |
| G05D 1/00 | (2006.01) |
| A63H 33/26 | (2006.01) |
| G05D 1/02 | (2006.01) |

(52) U.S. Cl.
CPC .............. *B62D 61/00* (2013.01); *G05D 1/0016* (2013.01); *G05D 1/0044* (2013.01); *G05D 1/027* (2013.01); *G05D 1/0278* (2013.01); *B60R 2011/007* (2013.01); *G05D 1/0259* (2013.01); *G05D 2201/0214* (2013.01); *Y10S 901/01* (2013.01)

(56) References Cited

U.S. PATENT DOCUMENTS

| | | | |
|---|---|---|---|
| 4,519,466 A | 5/1985 | Shiraishi | |
| 4,996,468 A | 2/1991 | Field et al. | |
| 5,213,176 A | 5/1993 | Oroku et al. | |
| 5,297,981 A | 3/1994 | Maxim et al. | |
| 5,628,232 A | 5/1997 | Bakholdin et al. | |
| 5,739,657 A | 4/1998 | Takayama et al. | |
| 5,793,142 A | 8/1998 | Salter et al. | |
| 5,952,796 A | 9/1999 | Colgate et al. | |
| 6,144,128 A * | 11/2000 | Rosen ...................... B60L 11/16 |
| | | | 310/74 |
| 6,227,933 B1 | 5/2001 | Michaud et al. | |
| 6,246,927 B1 | 6/2001 | Dratman | |
| 6,320,352 B2 | 11/2001 | Terazoe | |
| 6,458,008 B1 | 10/2002 | Hyneman | |
| 6,459,955 B1 | 10/2002 | Bartsch et al. | |
| 6,573,883 B1 | 6/2003 | Bartlett | |
| 6,615,109 B1 | 9/2003 | Matsuoka et al. | |
| 6,764,373 B1 | 7/2004 | Osawa et al. | |
| 6,785,590 B2 | 8/2004 | Kasuga et al. | |
| 6,945,843 B1 | 9/2005 | Motosko | |
| 6,980,956 B1 | 12/2005 | Takagi et al. | |
| 7,069,113 B2 | 6/2006 | Matsuoka et al. | |
| 7,170,047 B2 * | 1/2007 | Pal ........................ G01D 5/347 |
| | | | 250/231.13 |
| 7,173,604 B2 | 2/2007 | Marvit et al. | |
| 7,258,591 B2 | 8/2007 | Xu et al. | |
| 7,340,077 B2 | 3/2008 | Gokturk et al. | |
| 7,344,430 B2 | 3/2008 | Hasty et al. | |
| 7,432,718 B2 | 10/2008 | Ishihara et al. | |
| 7,463,001 B2 | 12/2008 | Tsurukawa | |
| 7,526,362 B2 | 4/2009 | Kim et al. | |
| 7,714,880 B2 | 5/2010 | Johnson | |
| 7,726,422 B2 | 6/2010 | Sun et al. | |
| 7,822,507 B2 | 10/2010 | Ishihara et al. | |
| 7,847,504 B2 | 12/2010 | Hollis | |
| 7,853,357 B2 | 12/2010 | Sawada et al. | |
| 7,957,837 B2 | 6/2011 | Ziegler et al. | |
| 7,979,162 B2 | 7/2011 | Niemela et al. | |
| 8,025,551 B2 | 9/2011 | Torres et al. | |
| 8,038,504 B1 | 10/2011 | Wong | |
| 8,099,189 B2 | 1/2012 | Kaznov et al. | |
| 8,128,450 B2 | 3/2012 | Imai | |
| 8,128,500 B1 | 3/2012 | Borst et al. | |
| 8,142,287 B2 | 3/2012 | Podoloff | |
| 8,180,436 B2 | 5/2012 | Boyden et al. | |
| 8,195,333 B2 | 6/2012 | Ziegler et al. | |
| 8,197,298 B2 | 6/2012 | Willett | |
| 8,258,917 B2 | 9/2012 | Cai et al. | |
| 8,269,447 B2 * | 9/2012 | Smoot ...................... B62K 1/00 |
| | | | 180/24.01 |
| 8,274,406 B2 | 9/2012 | Karlsson et al. | |
| 8,275,544 B1 | 9/2012 | Wells et al. | |
| 8,326,469 B2 | 12/2012 | Phillips et al. | |
| 8,352,643 B2 | 1/2013 | Birnbaum et al. | |
| 8,355,818 B2 | 1/2013 | Nielsen et al. | |
| 8,364,136 B2 | 1/2013 | Hoffberg et al. | |
| 8,376,756 B2 | 2/2013 | Robb | |
| 8,392,065 B2 | 3/2013 | Tolstedt et al. | |
| 8,396,611 B2 | 3/2013 | Phillips et al. | |
| 8,417,384 B2 | 4/2013 | Togawa et al. | |
| 8,430,192 B2 | 4/2013 | Gillett | |
| 8,456,298 B2 | 6/2013 | Valtonen | |
| 8,459,383 B1 * | 6/2013 | Burget ................... B60B 19/003 |
| | | | 180/7.1 |
| 8,522,902 B2 | 9/2013 | Gomi et al. | |
| 8,540,038 B1 | 9/2013 | Ullman | |
| 8,571,781 B2 | 10/2013 | Bernstein et al. | |
| 8,577,595 B2 | 11/2013 | Zhao et al. | |
| 8,600,600 B2 * | 12/2013 | Jung ....................... B60B 19/14 |
| | | | 701/22 |
| 8,670,889 B2 | 3/2014 | Kaznov | |
| 8,672,062 B2 | 3/2014 | Schroll et al. | |
| 8,788,130 B1 | 7/2014 | Tran et al. | |
| 8,838,273 B2 | 9/2014 | Hvass et al. | |
| 8,862,301 B2 | 10/2014 | Araki et al. | |
| 9,011,197 B2 | 4/2015 | Smoot et al. | |
| 9,014,848 B2 | 4/2015 | Farlow et al. | |
| 9,211,920 B1 * | 12/2015 | Bernstein ............... B62D 39/00 |
| 2003/0093182 A1 | 5/2003 | Yokoyama | |
| 2004/0002843 A1 | 1/2004 | Robarts et al. | |
| 2004/0168837 A1 | 9/2004 | Michaud et al. | |
| 2004/0182614 A1 | 9/2004 | Wakui | |
| 2004/0186623 A1 | 9/2004 | Dooley et al. | |
| 2005/0226192 A1 | 10/2005 | Red et al. | |
| 2005/0264472 A1 | 12/2005 | Rast | |
| 2006/0095158 A1 | 5/2006 | Lee et al. | |
| 2006/0101465 A1 | 5/2006 | Kato et al. | |
| 2006/0271251 A1 | 11/2006 | Hopkins | |
| 2007/0112462 A1 | 5/2007 | Kim et al. | |
| 2007/0249422 A1 | 10/2007 | Podoloff | |
| 2007/0259592 A1 | 11/2007 | Imai et al. | |
| 2008/0033641 A1 | 2/2008 | Medalia | |
| 2008/0182479 A1 | 7/2008 | Elliott et al. | |
| 2008/0240507 A1 | 10/2008 | Niwa et al. | |
| 2008/0263628 A1 | 10/2008 | Norman et al. | |
| 2008/0267450 A1 | 10/2008 | Sugimoto et al. | |
| 2008/0269949 A1 | 10/2008 | Norman et al. | |
| 2009/0055019 A1 | 2/2009 | Stiehl et al. | |
| 2009/0057238 A1 | 3/2009 | Garti | |
| 2009/0078484 A1 | 3/2009 | Kocijan | |
| 2009/0081923 A1 | 3/2009 | Dooley et al. | |
| 2009/0204261 A1 | 8/2009 | Strand et al. | |
| 2009/0226035 A1 | 9/2009 | Iihoshi et al. | |
| 2009/0262074 A1 | 10/2009 | Nasiri et al. | |
| 2010/0010669 A1 | 1/2010 | Lee et al. | |
| 2010/0032224 A1 | 2/2010 | Liu | |
| 2010/0063652 A1 | 3/2010 | Anderson | |
| 2010/0066676 A1 | 3/2010 | Kramer et al. | |
| 2010/0106344 A1 | 4/2010 | Edwards et al. | |
| 2010/0145236 A1 | 6/2010 | Greenberg et al. | |
| 2010/0169098 A1 | 7/2010 | Patch | |
| 2010/0172287 A1 | 7/2010 | Krieter | |
| 2010/0183195 A1 | 7/2010 | Sharma | |
| 2010/0234993 A1 | 9/2010 | Seelinger et al. | |
| 2010/0241289 A1 | 9/2010 | Sandberg | |
| 2010/0261526 A1 | 10/2010 | Anderson et al. | |
| 2010/0264756 A1 * | 10/2010 | Lee ........................ F04B 35/045 |
| | | | 310/38 |
| 2010/0305778 A1 | 12/2010 | Dorneich et al. | |
| 2010/0305781 A1 | 12/2010 | Felix | |

(56) References Cited

U.S. PATENT DOCUMENTS

| | | |
|---|---|---|
| 2010/0324753 A1 | 12/2010 | Okumatsu |
| 2011/0003640 A9 | 1/2011 | Ehrman |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2011/0050940 A1 | 3/2011 | Lanz et al. |
| 2011/0060492 A1 | 3/2011 | Kaznov |
| 2011/0065488 A1 | 3/2011 | Okamura et al. |
| 2011/0071652 A1 | 3/2011 | Brown et al. |
| 2011/0071702 A1 | 3/2011 | Wang et al. |
| 2011/0082566 A1 | 4/2011 | Herr et al. |
| 2011/0087371 A1 | 4/2011 | Sandberg et al. |
| 2011/0174565 A1 | 7/2011 | Rochat et al. |
| 2011/0184590 A1 | 7/2011 | Duggan et al. |
| 2011/0213278 A1 | 9/2011 | Horak et al. |
| 2011/0234488 A1 | 9/2011 | Ge et al. |
| 2011/0250967 A1 | 10/2011 | Kulas |
| 2011/0291926 A1 | 12/2011 | Gokturk et al. |
| 2011/0313568 A1 | 12/2011 | Blackwell et al. |
| 2011/0320830 A1 | 12/2011 | Ito |
| 2012/0009845 A1 | 1/2012 | Schmelzer |
| 2012/0035799 A1 | 2/2012 | Ehrmann |
| 2012/0065747 A1 | 3/2012 | Brown et al. |
| 2012/0083945 A1 | 4/2012 | Oakley et al. |
| 2012/0106783 A1 | 5/2012 | Chang et al. |
| 2012/0146775 A1 | 6/2012 | Kudo et al. |
| 2012/0167014 A1 | 6/2012 | Joo et al. |
| 2012/0168240 A1 | 7/2012 | Wilson et al. |
| 2012/0168241 A1 | 7/2012 | Bernstein et al. |
| 2012/0173018 A1 | 7/2012 | Allen et al. |
| 2012/0173047 A1 | 7/2012 | Bernstein et al. |
| 2012/0185115 A1 | 7/2012 | Dean |
| 2012/0193154 A1 | 8/2012 | Wellborn et al. |
| 2012/0197439 A1 | 8/2012 | Wang et al. |
| 2012/0200380 A1 | 8/2012 | Kocijan |
| 2012/0215355 A1 | 8/2012 | Bewley et al. |
| 2012/0291926 A1 | 11/2012 | Misra et al. |
| 2012/0298049 A1 | 11/2012 | Cook et al. |
| 2012/0298430 A1 | 11/2012 | Schroll et al. |
| 2012/0311810 A1 | 12/2012 | Gilbert et al. |
| 2013/0040533 A1 | 2/2013 | Miller |
| 2013/0050069 A1 | 2/2013 | Ota |
| 2013/0065482 A1 | 3/2013 | Trickett |
| 2013/0109272 A1 | 5/2013 | Rindlisbacher |
| 2013/0113307 A1* | 5/2013 | Kim .................. H02K 5/04 310/40.5 |
| 2013/0143482 A1 | 6/2013 | Regier |
| 2014/0238762 A1 | 8/2014 | Berberian et al. |

FOREIGN PATENT DOCUMENTS

| | | |
|---|---|---|
| CN | 102060060 | 5/2011 |
| DE | 101 46 862 A1 | 5/2002 |
| JP | 03182290 A | 8/1991 |
| JP | H07-308462 | 11/1995 |
| JP | 09254838 A | 9/1997 |
| JP | 2000218578 A | 8/2000 |
| JP | 2004-148439 | 5/2004 |
| KR | 10-2009-0000013 A | 1/2009 |
| KR | 10-0969873 B1 | 7/2010 |
| KR | 10-2008-040725 A | 5/2011 |
| WO | WO-97/25239 A1 | 7/1997 |
| WO | WO-2006/049559 A1 | 5/2006 |
| WO | WO-2012/094349 A2 | 7/2012 |

OTHER PUBLICATIONS

Koshiyama et al., Machine Translation for JP 2000-218578, Aug. 8, 2000, 11 Pages.

GearBox Ball Prototype Jun. 29, 2010, Pictures from Video [online]. Orbotix, Inc., Jun. 30, 2010, 91 pages. Retrieved from the internet:<URL: http://www.youtube.com/watch?v=qRBM7bAaXpU>.

International Search Report and The Written Opinion of the International Searching Authority mailed Aug. 28, 2013, for related PCT Application No. PCT/US2013/041023 filed May 14, 2013, 11 pages.

Liu, Dalian et al., "Motion Control of a Spherical Mobile Robot by Feedback Linearization," 7th WC on IC&A, Jun. 27, 2008, Chongqing, China, pp. 965-970. 6 pages.

Shu, Guanghui et al., "Motion Control of Spherical Robot Based on Conservation of Angular Momentum," IEEE Intl Conf on Mechatronics & Automation, Aug. 9, 2012, Changchun, China, pp. 599-604. 6 pages.

Joshi, Vrunda et al., "Design, modeling and controllability of a spherical mobile robot", 13th Natl Conf on Mechanisms & Machines (NaCoMM07) IISc, Bangalore, India, Dec. 13, 2007, pp. 1-6.

Harmo, Panu et al., "Moving Eye—Interactive Telepresence over Internet with a Ball Shaped Mobile Robot," Automation Tech Lab, Finland, Oct. 2, 2001. 6 pages. http://automation.tkk.fi/files/tervetaas/MovingEye4.pdf.

Halme, Aarne, et al., "Motion Control of a Spherical Mobile Robot", Helsinki, IEEE AMC '1996, pp. 259-264. 6 pages.

Notification of Transmittal of International Search Report and The Written Opinion of the International Searching Authority mailed Aug. 26, 2014, for related PCT Application No. PCT/US2014/037013 filed May 6, 2014, 10 pages.

European Search Report and European Search Opinion mailed Nov. 6, 2014, for related EP Application No. 12731945.7 filed Jul. 26, 2013. 7 pages.

International Search Report and The Written Opinion of the International Searching Authority mailed Mar. 2, 2015, for related PCT Application No. PCT/US2014/068606 filed Dec. 4, 2014, 9 pages.

International Search Report and The Written Opinion of the International Searching Authority mailed Aug. 13, 2015, for related PCT Application No. PCT/US2015/030877 filed May 14, 2015, 7 pages.

International Search Report and Written Opinion in corresponding International Application PCT/US2015/044885 dated Oct. 29, 2015.

* cited by examiner

MAGNETICALLY COUPLED ACCESSORY FOR A SELF-PROPELLED DEVICE

RELATED APPLICATIONS

This application is a Continuation of U.S. patent application Ser. No. 14/663,446, entitled "MAGNETICALLY COUPLED ACCESSORY FOR A SELF-PROPELLED DEVICE", filed Mar. 19, 2015; which is a Continuation of U.S. patent application Ser. No. 14/459,235, entitled "MAGNETICALLY COUPLED ACCESSORY FOR A SELF-PROPELLED DEVICE", filed Aug. 13, 2014; now U.S. Pat. No. 9,090,214, issued Jul. 28, 2015; which is a Continuation-in-part of U.S. patent application Ser. No. 14/035,841, entitled "SELF-PROPELLED DEVICE WITH ACTIVELY ENGAGED DRIVE SYSTEM," filed Sep. 24, 2013; which is a Continuation of U.S. patent application Ser. No. 13/342,853, entitled "SELF-PROPELLED DEVICE WITH ACTIVELY ENGAGED DRIVE SYSTEM", filed Jan. 3, 2012, now U.S. Pat. No. 8,571,781, issued Oct. 29, 2013; which claims the benefit under 35 U.S.C. §119(e) to (i) U.S. Provisional Patent Application Ser. No. 61/430,023, entitled "METHOD AND SYSTEM FOR CONTROLLING A ROBOTIC DEVICE", filed Jan. 5, 2011; (ii) U.S. Provisional Patent Application Ser. No. 61/430,083, entitled "METHOD AND SYSTEM FOR ESTABLISHING 2-WAY COMMUNICATION FOR CONTROLLING A ROBOTIC DEVICE", filed Jan. 5, 2011; and (iii) U.S. Provisional Patent Application Ser. No. 61/553,923, entitled "A SELF-PROPELLED DEVICE AND SYSTEM AND METHOD FOR CONTROLLING SAME", filed Oct. 31, 2011. All of the aforementioned priority applications are hereby incorporated by reference in their respective entirety.

BACKGROUND

Remote controlled devices have previously been operated using specialized remote controllers specific to a particular device. Accessories to remote controlled devices typically involve physical fastening means to connect the accessories to portions of a frame or housing.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
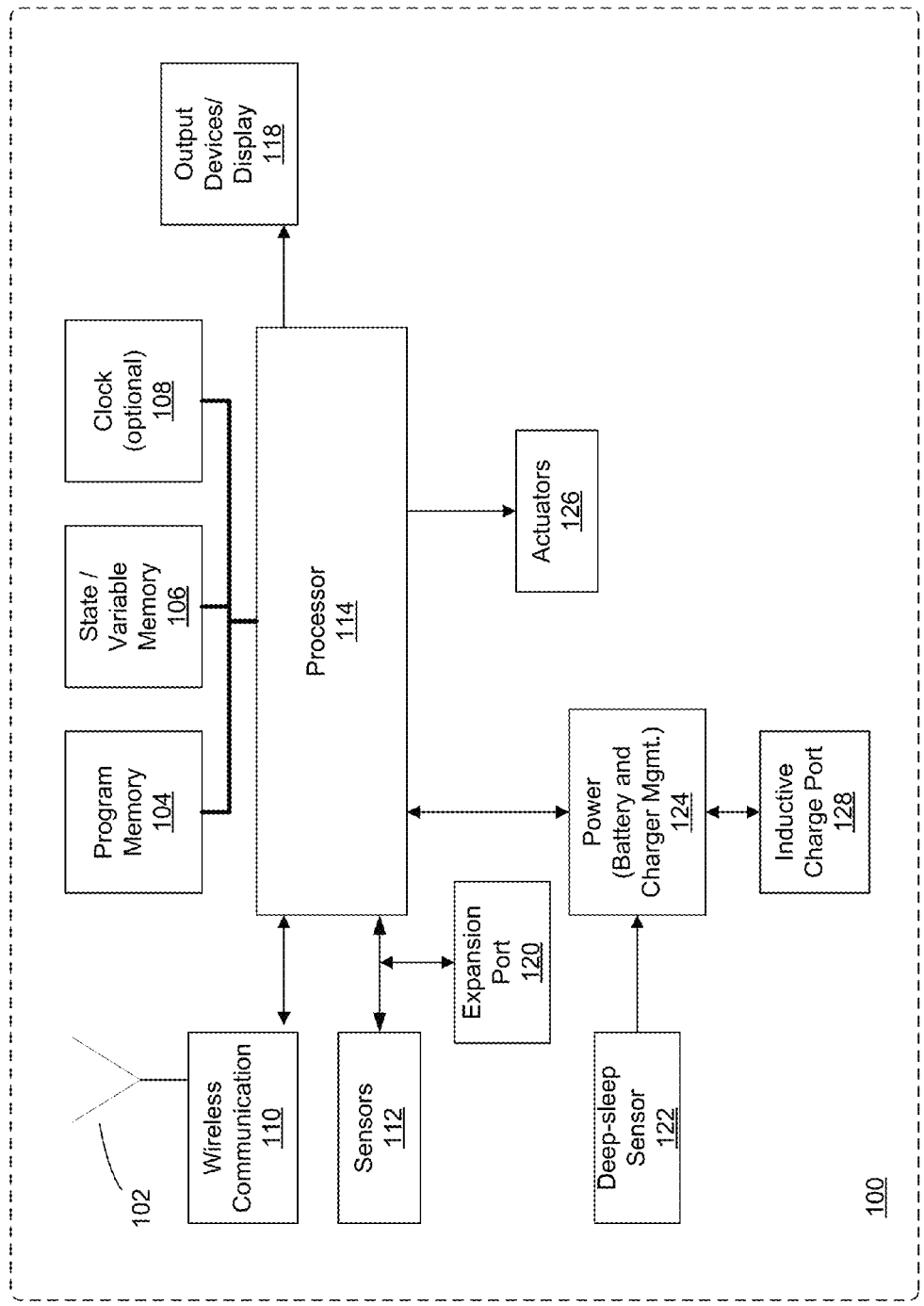
FIG. 1 is an example block diagram illustrating a system to control operation of a self-propelled device.

A self-propelled device is disclosed that includes a spherical housing and an internal drive system including one or more motors coupled to one or more wheels engaged to an inner surface of the spherical housing. A biasing mechanism, including a spring and a contact end, is coupled to the internal drive system to provide diametrically opposing force between the wheels and contact end to allow for power to the motors to be transferred to the inner surface of the spherical housing, causing the self-propelled device to roll along a surface. The self-propelled device can rotate based on a combination of movement of its center of mass, independent power to the motors, and the force of the biasing mechanism against the inner surface. A magnetic coupling component may be included with the biasing mechanism. The magnetic coupling component can comprise ferrous metal or a permanent magnet, such as a neodymium magnet, to provide a magnetic field through the spherical housing to magnetically interact with external devices or accessories.

An example external accessory is disclosed that includes a magnetic coupling component to magnetically couple with the magnetic coupling component of the biasing mechanism (e.g., the contact end). Accordingly, when the spherical housing of the self-propelled device is caused to roll, the external accessory can remain stably coupled to the contact end of the biasing mechanism via magnetic interaction through the spherical housing.

Either the self-propelled device, the external accessory, or both can include a magnet (e.g., a neodymium magnet) to produce the magnetic field causing the magnetic interaction. Such interaction may involve a magnetic attraction in which contact occurs between the external accessory and the outer surface of the spherical housing. In such examples, friction may be reduced by coating the outer surface of the spherical housing and/or a contact surface of the external accessory with a substantially frictionless material. Additionally or alternatively, the magnetic interaction may involve a repulsive force including stability mechanism (e.g., one or more further magnets) to create stable magnetic levitation between the external accessory and the spherical housing.

As used herein, "substantially" means between zero degrees and less than 90 degrees in the context of an angular rotation of the biasing mechanism while the self-propelled device is under operational control. Accordingly, a "substantially" stable, a "substantially" constant angle, or a "substantial" perpendicularity between the biasing mechanism (or spring component) and an external surface on which the self-propelled device rolls, means less than 90 degrees with respect to that surface, and typically less than 45 degrees while the self-propelled device is in a non-accelerated state. As further used herein, "substantially" in the context of friction between the outer surface of the spherical housing and the contact surface of the external accessory device, means a below normal frictional relation between two typical smooth surfaces (e.g., polished metal or wood surfaces). Thus, a "substantially" frictionless material means a material designed or manufactured for reduced friction such as a TEFLON® or a DELRIN® coating.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System Description

Referring now to the drawings, FIG. 1 is an example schematic depiction of a self-propelled device 100. The self-propelled device 100 can be operated to move under control of another device, such as a computing device operated by a user. The self-propelled device 100 can be configured with resources that enable one or more of the following: (i) maintain self-awareness of orientation and/or position relative to an initial reference frame after the device initiates movement; (ii) process control input programmatically, so as to enable a diverse range of program-specific responses to different control inputs; (iii) enable another device to control its movement using software or programming logic that is communicative with programming logic on the self-propelled device; and/or (iv) generate an output response for its movement and state that it is software interpretable by the control device.

The self-propelled device 100 can include several interconnected subsystems and modules. A processor 114 can execute programmatic instructions from a program memory 104. The instructions stored in the program memory 104 can be changed, for example to add features, correct flaws, or modify behavior. In some variations, the program memory 104 stores programming instructions that are communicative or otherwise operable with software executing on a linked controller device. The processor 114 is configured to execute different programs of programming instructions, in order to alter the manner in which the self-propelled device 100 interprets or otherwise responds to control inputs from the controller device.

A wireless communication port 110, in conjunction with a communication transducer 102, serves to exchange data between the processor 114 and other external devices. The data exchanges, for example, provide communications, control, logical instructions, state information, and/or updates for the program memory 104. The processor 114 can generate output corresponding to state and/or position information, communicated to the controller device via the wireless communication port 110. The mobility of the self-propelled device 100 may make wired connections undesirable. Thus, the term "connection" may be understood to mean a logical connection, such as a wireless link (e.g., BLUETOOTH), made without a physical connection to self-propelled device 100.

In variations, the wireless communication port 110 implements the BLUETOOTH communications protocol and the transducer 102 is an antenna suitable for transmission and reception of BLUETOOTH radio signals. Other wireless communication mediums and protocols may also be used in alternative implementations.

Sensors 112 can provide information about the surrounding environment and condition to the processor 114. In some variations, the sensors 112 include inertial measurement devices, including a three-axis gyroscope, a three-axis accelerometer, and/or a three-axis magnetometer. According to some variations, the sensors 114 provide input to enable the processor 114 to maintain awareness of the device's orientation and/or position relative to an initial reference frame after the device initiates movement. In various examples, the sensors 112 include instruments for detecting light, temperature, humidity, and/or measuring chemical concentrations or radioactivity.

State/variable memory 106 stores information about the present state of the system, including, for example, position, orientation, rates of rotation and translation about each axis. The state/variable memory 106 also stores information corresponding to an initial reference frame of the device upon, for example, the device being put in use (e.g., the device being switched on), as well as position and orientation information once the device is in use. In this way, some embodiments provide for the device 100 to utilize information of the state/variable memory 106 in order to maintain position and orientation information of the device 100 once the device starts moving.

A clock 108 provides timing information to the processor 114. In one example, the clock 108 provides a time-base for measuring intervals and rates of change. In similar examples, the clock 108 provides day, date, year, time, and alarm functions. The clock 108 can allow the self-propelled device 100 to provide an alarm or alert at pre-set times.

An expansion port 120 provides a connection for addition of accessories or devices. The expansion port 120 can provide for future expansion, as well as flexibility to add options or enhancements. For example, the expansion port 120 can be used to add peripherals, sensors, processing hardware, storage, displays, or actuators to the basic self-propelled device 100.

In variations, the expansion port 120 provides an interface capable of communicating with a suitably configured component using analog or digital signals. Thus, the expansion port 120 can provide electrical interfaces and protocols that are standard or well-known. Furthermore, the expansion port 120 implements an optical interface. Example interfaces appropriate for expansion port 120 include the Universal Serial Bus (USB), Inter-Integrated Circuit Bus (I2C), Serial Peripheral Interface (SPI), or ETHERNET.

A display 118 may be included to present information to outside devices or persons. The display 118 can present information in a variety of forms. In variations, display 118 can produce light in colors and patterns, sound, vibration, music, or combinations of sensory stimuli. In one embodiment, display 118 operates in conjunction with actuators 126 to communicate information by physical movements of device 100. For example, device 100 can be made to emulate a human head nod or shake to communicate "yes" or "no."

In variations, the display 118 is an emitter of light, either in the visible or invisible range. Invisible light in the infrared or ultraviolet range may be useful, for example to send information invisible to human senses but available to specialized detectors. In some examples, the display 118 includes an array of Light Emitting Diodes (LEDs) emitting various light frequencies, arranged such that their relative intensity is variable and the light emitted is blended to form color mixtures.

In variations, the display 118 includes an LED array comprising several LEDs, each emitting a human-visible primary color. The processor 114 can vary the relative intensity of each of the LEDs to produce a wide range of colors. Primary colors of light are those in which a few colors can be blended in different amounts to produce a wide gamut of apparent colors. Many sets of primary colors are known, including for example red/green/blue, red/green/blue/white, and red/green/blue/amber. For example, red, green and blue LEDs together can comprise a usable set of three available primary-color devices comprising the display 118. In other examples, other sets of primary colors and white LEDs can be used. The display 118 can further include an LED used to indicate a reference point on the device 100 for alignment.

Power 124 stores energy for operating the electronics and electromechanical components of the device 100. In some examples, power 124 is a rechargeable battery. Furthermore, an inductive charge port 128 can allow for recharging power 124 without a wired electrical connection. In variations, the inductive charge port 128 can accept magnetic energy and convert it to electrical energy to recharge the batteries. The charge port 128 can provide a wireless communication interface with an external charging device.

A deep sleep sensor 122 can be included to place the self-propelled device 100 into a very low power or "deep sleep" mode where most of the electronic devices use no battery power. This may be useful for long-term storage or shipping.

In variations, the deep sleep sensor 122 is non-contact in that it senses through the housing of device 100 without a wired connection. The deep sleep sensor 122 may be a Hall Effect sensor mounted so that an external magnet can be applied at a pre-determined location on device 100 to activate the deep sleep mode.

Actuators 126 may be included to convert electrical energy into mechanical energy for various uses. A primary use of the actuators 126 is to propel and steer self-propelled device 100. Movement and steering actuators are also referred to as a drive system or traction system. The drive system moves device 100 in rotation and translation, under control of the processor 114. Examples of actuators 126 include, without limitation, wheels, motors, solenoids, propellers, paddle wheels, and pendulums.

The drive system actuators 126 can include two parallel wheels, each mounted to an axle connected to an independently variable-speed motor through a reduction gear system. Thus, the speeds of the two drive motors can controlled by the processor 114.

However, it should be appreciated that the actuators 126 can produce a variety of movements in addition to merely rotating and translating the self-propelled device 100. Thus, in some variations, the actuators 126 cause the device 100 to execute communicative or emotionally evocative movements, including emulation of human gestures, for example, head nodding, shaking, trembling, spinning, or flipping. In some variations, the processor 114 coordinates the actuators 126 with the display 118. For example, the processor 114 can provide signals to the actuators 126 and the display 118 to cause the device 100 to spin or tremble and simultaneously emit patterns of colored light. Thus, the device 100 can emit light and/or sound patterns synchronized with movements.

In further variations, the self-propelled device 100 can be used as a controller for other network-connected devices. The device 100 can contain sensors and wireless communication capability, and so it can perform a controller role for other devices. For example, the self-propelled device 100 can be held in the hand and used to sense gestures, movements, rotations, combination inputs, and the like.

Figure 2:
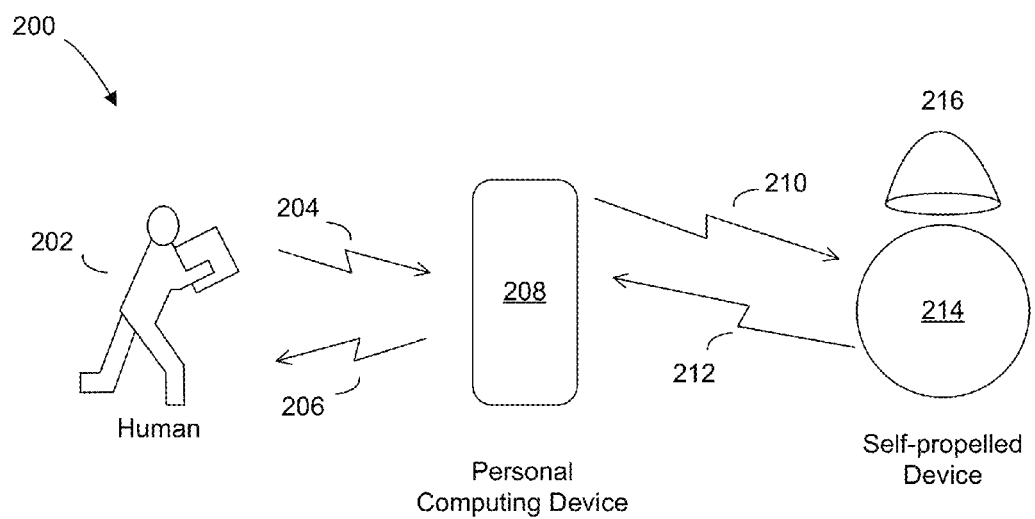
FIG. 2 is a schematic depiction of a self-propelled device under control of a controller device.

FIG. 2 is an example schematic depiction of a self-propelled device 214 under control of a controller device 208, such as a smart phone or tablet computing device. More specifically, the self-propelled device 214 can be controlled in its movement by programming logic and/or controls that can originate from the controller device 208. The self-propelled device 214 is capable of movement under control of the computing device 208, which can be operated by a user 202. The computing device 208 can wirelessly communicate control data 204 to the self-propelled device 214 using a standard or proprietary wireless communication protocol. In variations, the self-propelled device 214 may be at least partially self-controlled, utilizing sensors and internal programming logic to control the parameters of its movement (e.g., velocity, direction, etc.). Still further, the self-propelled device 214 can communicate data relating to the device's position and/or movement parameters for the purpose of generating or alternating content on the computing device 208. In additional variations, self-propelled device 214 can control aspects of the computing device 208 by way of its movements and/or internal programming logic.

As described herein, the self-propelled device 214 may have multiple modes of operation, including those of operation in which the device is controlled by the computing device 208, is a controller for another device (e.g., another self-propelled device or the computing device 208), and/or is partially or wholly self-autonomous.

Additionally, embodiments enable the self-propelled device 214 and the computing device 208 to share a computing platform on which programming logic is shared, in order to enable, among other features, functionality that includes: (i) enabling the user 202 to operate the computing device 208 to generate multiple kinds of input, including simple directional input, command input, gesture input, motion or other sensory input, voice input or combinations thereof; (ii) enabling the self-propelled device 214 to interpret input received from the computing device 208 as a command or set of commands; and/or (iii) enabling the self-propelled device 214 to communicate data regarding that device's position, movement and/or state in order to effect a state on the computing device 208 (e.g., display state, such as content corresponding to a controller-user interface). Examples further provide that the self-propelled device 214 includes a programmatic interface that facilitates additional programming logic and/or instructions to use the device. The computing device 208 can execute programming that is communicative with the programming logic on the self-propelled device 214.

According to some examples, the self-propelled device 214 includes an actuator or drive mechanism causing motion or directional movement. The self-propelled device 214 may be referred to by a number of related terms and phrases, including controlled device, robot, robotic device, remote device, autonomous device, and remote-controlled device. In some examples, the self-propelled device 214 can be structured to move and be controlled in various media. For example, self-propelled device 214 can be configured for movement in media such as on flat surfaces, sandy surfaces or rocky surfaces.

The self-propelled device 214 may be implemented in various forms. As described below and with an example of FIG. 3, the self-propelled device 214 may correspond to a spherical object that can roll and/or perform other movements such as spinning. In such variations, the self-propelled device 214 can include an external accessory 216 to be magnetically coupled to the self-propelled device 214 via magnetic coupling through the device's 214 housing.

In other variations, the self-propelled device 214 can correspond to a radio-controlled aircraft, such as an airplane, helicopter, hovercraft or balloon. In other variations, device 214 can correspond to a radio controlled watercraft, such as a boat or submarine. Numerous other variations may also be implemented, such as those in which the device 214 is a robot.

In one embodiment, the self-propelled device 214 includes a sealed hollow envelope, substantially spherical in shape, capable of directional movement by action of actuators inside the enclosing envelope.

Continuing to refer to FIG. 2, the self-propelled device 214 can be configured to communicate with the computing device 208 using network communication links 210 and 212. Link 210 can transfer data from device 208 to device 214. Link 212 can transfer data from the self-propelled device 214 to the computing device 208. Links 210 and 212 are shown as separate unidirectional links for illustration, however, a single bi-directional communication link can perform communications in both directions. It should be appreciated that link 210 and link 212 are not necessarily identical in type, bandwidth, or capability. For example, communication link 210 from the computing device 208 to the self-propelled device 214 is often capable of a higher communication rate and bandwidth compared to link 212. In some situations, only one link 210 or 212 is established. In such a situation, communication is unidirectional.

The computing device 208 can correspond to any device comprising at least a processor and communication capability suitable for establishing at least unidirectional communications with the self-propelled device 214. Examples of such devices may include, without limitation: mobile computing devices (e.g., multifunctional messaging/voice communication devices such as smart phones), tablet computers, portable communication devices and personal computers. In some variations, the computing device 208 is an IPHONE available from APPLE COMPUTER, INC. of Cupertino, Calif. In other variations, the computing device 208 is an IPAD tablet computer, also from APPLE COMPUTER. In still other variations, the computing device 208 is any of the handheld computing and communication appliances executing the ANDROID operating system from GOOGLE, INC.

In still other variations, the computing device 208 is a personal computer, in either a laptop or desktop configuration. For example, device 208 can be a multi-purpose computing platform running the MICROSOFT WINDOWS operating system, the LINUX operating system, or the APPLE OS/X operating system, configured with an appropriate application program to communicate with self-propelled device 214.

In variations, the computing device 208 can be a specialized device, dedicated for enabling the user 202 to control and interact with the self-propelled device 214.

In one embodiment, multiple types of computing device 208 can be used interchangeably to communicate with the self-propelled device 214. In one embodiment, self-propelled device 214 is capable of communicating and/or being controlled by multiple devices (e.g., concurrently or one at a time). For example, device 214 can link with an IPHONE in one session and with an ANDROID device in a later session, without modification of device 214.

According to some variations, the user 202 can interact with the self-propelled device 214 via the computing device 208 in order to control the self-propelled device 214 and/or to receive feedback or interaction on the computing device 208 from the self-propelled device 214. As such, the user 202 may be enabled to specify input 204 through various mechanisms that are provided with the computing device 208. Examples of such inputs include text entry, voice command, touching a sensing surface or screen, physical manipulations, gestures, taps, shaking, and combinations of the above.

The user 202 may interact with the computing device 208 in order to receive feedback 206. The feedback 206 may be generated on the computing device 208 in response to user input. As an alternative or addition, the feedback 206 may also be based on data communicated from the self-propelled device 214 to the computing device 208, regarding, for example, the self-propelled device's position or state. Without limitation, examples of feedback 206 include text display, graphical display, sound, music, tonal patterns, modulation of color or intensity of light, haptic, vibrational or tactile stimulation. The feedback 206 may be combined with input that is generated on the computing device 208. For example, the computing device 208 may output content that is modified to reflect position or state information communicated from the self-propelled device 214.

In some embodiments, the computing device 208 and/or the self-propelled device 214 are configured such that user input 204 and feedback 206 maximize usability and accessibility for a user 202, who has limited sensing, thinking, perception, motor, or other abilities. This allows users with handicaps or special needs to operate system 200 as described.

It should be appreciated that the configuration illustrated in the FIG. 2 is only one of various possible configurations of networks including a self-propelled device with communication connections. Furthermore, while numerous embodiments described herein provide for a user to operate or otherwise directly interface with the computing device in order to control and/or interact with a self-propelled device, variations to embodiments described encompass enabling the user to directly control or interact with the self-propelled device 214 without use of an intermediary device such as computing device 208.

Example Self-Propelled Device

Figure 3:
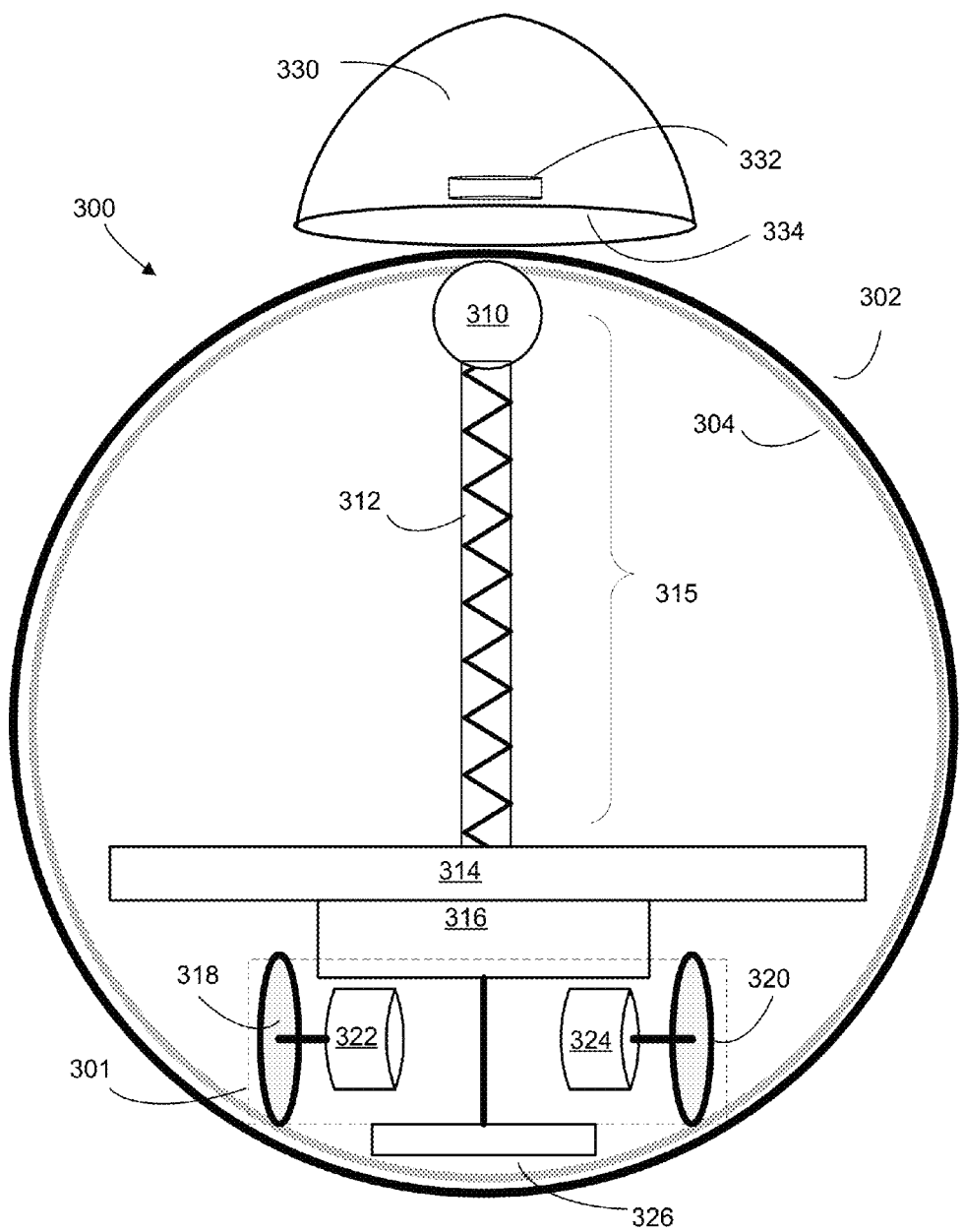
FIG. 3 illustrates an example of a self-propelled devices, and shows a schematic, illustrating components of the example spherical self-propelled device.

FIG. 3 illustrates an example of a self-propelled device 300, and shows a schematic illustrating the components of the example spherical self-propelled device. However, variations of the present disclosure are not limited to such devices. Rather, the above-discussed system 100 can be implemented with respect to any remote device in which pairings or connections are made. Referring to FIG. 3, the self-propelled device 300 can be of a size and weight allowing it to be easily grasped, lifted, and carried in an adult human hand. The self-propelled device 300 can include a spherical housing 302 with an outer surface that makes contact with an external surface as the device rolls. In addition, the spherical housing 302 includes an inner surface 304. Additionally, the self-propelled device 300 includes several mechanical and electronic components enclosed by the spherical housing 302.

The spherical housing 302 can be composed of a material that transmits signals used for wireless communication, yet are impervious to moisture and dirt. The spherical housing 302 can comprise a material that is durable, washable, and/or shatter-resistant. The spherical housing 302 may also be structured to enable transmission of light and can be textured to diffuse the light.

In one variation, the housing is made of sealed polycarbonate plastic. Furthermore, the spherical housing 302 can include on or more surfaces that are textured to diffuse light. In one example, the spherical housing 302 comprises two hemispherical shells with an associated attachment mechanism, such that the spherical housing 302 can be opened to allow access to the internal electronic and mechanical components.

Several electronic and mechanical components are located inside the envelope for enabling processing, wireless communication, propulsion and other functions (collectively referred to as the "interior mechanism"). Among the components, examples include a drive system 301 to enable the device to propel itself. The drive system 301 can be coupled to processing resources and other control mechanisms, as described with other examples. The carrier 314 serves as the attachment point and support for components of the drive system 301. The components of the drive system 301 are not rigidly attached to the spherical housing 302. Instead, the drive system 301 can include a pair of wheels 318, 320 that are in frictional contact with the inner surface 304 of the spherical housing 302.

The carrier 314 is in mechanical and electrical contact with an energy storage 316. The energy storage 316 provides a reservoir of energy to power the device 300 and electronics and can be replenished through an inductive charge port 326. The energy storage 316, in one example, is a rechargeable battery. In one variation, the battery is composed of lithium-polymer cells. In other variations, other rechargeable battery chemistries are used.

The carrier 314 can provide the mounting location for most of the internal components, including printed circuit boards for electronic assemblies, sensor arrays, antennas, and connectors, as well as providing a mechanical attachment point for internal components.

The drive system 301 can include motors 322, 324 and wheels 318, 320. The motors 322 and 324 connect to the wheels 318 and 320, respectively, each through an associated shaft, axle, and gear drive (not shown). The perimeter of wheels 318 and 320 are two points where the interior mechanism is in mechanical contact with inner surface 304. The points where wheels 318 and 320 contact inner surface 304 are an essential part of the drive mechanism of the ball, and so are preferably coated with a material to increase friction and reduce slippage. For example, the wheels 318 and 320 can be covered with silicone rubber tires.

In some variations, a biasing mechanism 315 is provided to actively force the wheels 318, 320 against the inner surface 304. In an example provided, a spring 312 and a spring end 310 can comprise the biasing mechanism 315. More specifically, the spring 312 and the spring end 310 are positioned to contact inner surface 304 at a point diametrically opposed to the wheels 318 and 320. The spring 312 and the spring end 310 provide additional contact force to reduce slippage of the wheels 318 and 320, particularly in situations where the interior mechanism is not positioned with the wheels at the bottom and where gravity does not provide adequate force to prevent the drive wheels 318, 320 from slipping. The spring 312 is selected to provide a force to press the wheels 318, 320 and the spring end 310 against inner surface 304.

The spring end 310 can be designed to provide near-frictionless contact with the inner surface 304. The spring end 310 can comprise a rounded surface configured to mirror a low-friction contact region at all contact points with the inner surface 304. Additional means of providing near-frictionless contact may be provided. In another implementation, the rounded surface may include one or more bearings to further reduce friction at the contact point where end 310 moves along inner surface 304. The spring 312 and the spring end 310 can be made of a non-magnetic material to avoid interference with sensitive magnetic sensors. However, in variations, the spring end 310 can include one or more magnetic components to magnetically couple to an external accessory device 330.

In some examples, the spring 312 has a spring constant such that the wheels 318, 320 and the spring end 310 are almost constantly engaged to the inner surface 304 of the spherical housing 302. As such, much of the power from the motors 322, 324 is transferred directly to rotating the spherical housing 302, as opposed to causing the internal components (i.e., the biasing mechanism 315 and internal drive system 301) to pitch. Thus, while motion of the self-propelled device 300 may be caused, at least partially, by pitching the internal components (and therefore the center of mass), motion may also be directly caused by active force of the wheels 318, 320 against the inner surface 304 of the spherical housing 302 (via the biasing mechanism 315) and direct transfer of electrical power from the motors 322, 324 to the wheels 318, 320. As such, the pitch of the biasing mechanism 315 may be substantially reduced, and remain substantially constant (e.g., substantially perpendicular to the external surface on which the self-propelled device 300 moves). Additionally or as an alternative, the pitch of the biasing mechanism 315 may increase (e.g., to over 45 degrees) during periods of hard acceleration or deceleration. Furthermore, under normal operating conditions, the pitch of the biasing mechanism 315, can remain stable or subtly vary (e.g., within 10-15 degrees).

The spring end 310 can be formed of a magnetic metal that can be attracted to a magnet. Such metals can include iron, nickel, cobalt, gadolinium, neodymium, samarium, or metal alloys containing proportions of these metals. Alternatively, the spring end 310 can include a substantially frictionless contact portion, in contact with the inner surface 304 of the spherical housing 302, and a magnetically interactive portion, in contact or non-contact with the inner surface 304, including the above metals or metal alloys. The substantially frictionless contact portion can be comprised of an organic polymer such as a thermoplastic or thermosetting polymer.

Alternatively, the spring end 310 can be formed of a magnet, such as a polished neodymium permanent magnet. In such variations, the spring end 310 can produce a magnetic field extending beyond the outer surface of the spherical housing 302 to magnetically couple with the external accessory device 330. Alternatively still, the spring end 310 can be comprised of a substantially frictionless contact portion, and have a magnet included therein.

Alternatively still, the magnetic component of the self-propelled device 300 may be included on any internal component, such as the spring 312 or the carrier 314, or an additional component coupled to the biasing mechanism 315 or the carrier 3114.

Additionally or alternatively, the external accessory device 330 can include a magnetic component 332 to magnetically couple with the biasing mechanism 315 (e.g., the spring end 310). The magnetic component 332 can comprise a permanent magnet, such as a neodymium magnet. In such variations, the magnetic component 332 can magnetically couple to the spring end 310. As such, the magnetic field produced by the magnetic component 332 can extend through the spherical housing 302 to remain in magnetic contact with the spring end 310.

Alternatively, the magnetic component 332 of the external accessory device 330 can comprise a magnetic metal that can be attracted to a magnet comprising the spring end 310. As stated above, such metals can include iron, nickel, cobalt, gadolinium, neodymium, samarium, or metal alloys containing proportions of these metals.

In further examples, one or more of the spring end 310 and the magnetic component can be comprised of any number of electro or permanent magnets. Such magnets may be irregular in shape to provide added magnetic stability upon motion of the self-propelled device 300. For example, the magnetic component 332 of the accessory device 330 can be a single or multiple magnetic strips including one or more tributary strips to couple with a single or multiple correspondingly shaped magnets included on the spring end 310. Furthermore, multiple magnets may be dispersed through the external accessory device 330 and the spring end 310 to provide additional stability.

Alternatively, the spring end 310 and external accessory device 330 can be in a stable magnetically repulsive state as the self-propelled device 300 moves. In such variations, either the magnetic component 332 or the spring end 310 can include a superconductor material to substantially eliminate dynamic instability of a repelling magnetic force in order to allow for stable magnetic levitation of the accessory device in relation to the spring end 310 while the spherical housing 302 rotates therebetween. In similar variations, a diamagnetic material may be included in one or more of the self-propelled device 300, spring end 310, or the external accessory device 330 and can provide stability for magnetic levitation. Thus, without the use of guiderails or a magnetic track, the self-propelled device 300 may be caused to maneuver in any direction with the external accessory device 330 remaining in a substantially constant position along a vertical axis of the self-propelled device (Cartesian or cylindrical z-axis, or spherical r-coordinate with no polar angle ($\theta$)).

The external accessory device 330 can be in the form of any shape and can be comprised of any suitable material. A contact surface 334 of the external accessory device, or a surface closest to the outer surface of the spherical housing 302 (during magnetic interaction), can be formed to substantially correspond to the outer surface of the spherical housing 304. As such, both the spherical housing 302 of the self-propelled device 300 and the external accessory device 330, namely the contact surface 334, can have substantially equivalent radii of curvature. In certain variation, this radius of curvature can be on the order of 10-30 cm. However, it is contemplated that other examples of self-propelled devices and accompanying external accessory devices may have a radius on the order of one meter upwards to the size of a human transportation vehicle and beyond. As such, magnetic coupling or interaction may be achieved using powerful electromagnets disposed within the self-propelled device 300 to couple with the external accessory device 330, which may be configured to perform actions, carry payload, include a novel design, represent a character or figure, or the like.

The contact surface 334 of the external accessory device 330 can be formed or coated with a substantially frictionless material, such as a synthetic compound or suitable polymer. Other suitable compounds include TEFLON® brand polytetrafluoroethylene (PTFE) or DELRIN® brand polyoxymethylene (POM) coatings. However, any substantially frictionless coating is contemplated, including ultra-repellant surfaces or liquid-impregnated surfaces and materials, such as slippery liquid infused porous surface (SLIPS). Further examples of substantially frictionless surfaces or coatings include "ceramic alloys," or "cermets," which may be created by combining a metal alloy with a ceramic compound. For example, a metal/ceramic alloy comprised of boron, aluminum, and magnesium ($AlMgB_{14}$) may be combined with the cermetic compound of titanium diboride ($TiB_2$) to provide a near-frictionless coating for the contact surface 334 of the external accessory device 330.

Additionally or as an alternative, the outer surface of the spherical housing 302 can be comprised of any of the above substantially frictionless coatings or compounds discussed with respect to the contact surface 334 of the external accessory device 330. Accordingly, any combination of substantially frictionless coatings or compounds may be incorporated with respect to the outer surface of the spherical housing 302 and the contact surface of the external accessory device 330.

Furthermore, the spherical housing 302 may be formed to include an inner surface 304 more conducive to providing added friction using, for example, a rubber compound or other suitable synthetic compound, such as a silicone. Additionally, the spherical housing 302 may be formed to include an outer surface having near-frictionless properties using coatings or compounds discuss above.

In the above examples, when the self-propelled device 300 moves, the external accessory device 330 can remain magnetically coupled to the spring end 310 at a substantially constant position on top of the self-propelled device 300. As such, while the self-propelled device 300 is being maneuvered, the biasing mechanism 315 may have a variable tilt angle (polar angle ($\theta$) relative to the plane of motion) that remains somewhat minimal, but in most cases, does not typically exceed 45 degrees, except during periods of relatively extreme acceleration. However, during continuous and stable maneuvering of the self-propelled device 300, the tilt of the biasing mechanism 315 may be closer to naught, or within 10 degrees. Furthermore, during maneuvering, the azimuth ($\phi$) can vary at any angle depending on independent power transferred from the motors 322, 344 to the wheels 318, 320.

The various examples described are for illustrative purposes. With any of the systems described, variations include the addition of more or fewer computing devices, and/or more or fewer self-propelled devices. As described with some variations, additional sources or nodes can be provided from a remote network source. Additionally, in some operational environments, the presence of the computing device is optional. For example, the self-propelled devices can be partially or completely autonomous, using programming logic to function.

Figure 4:
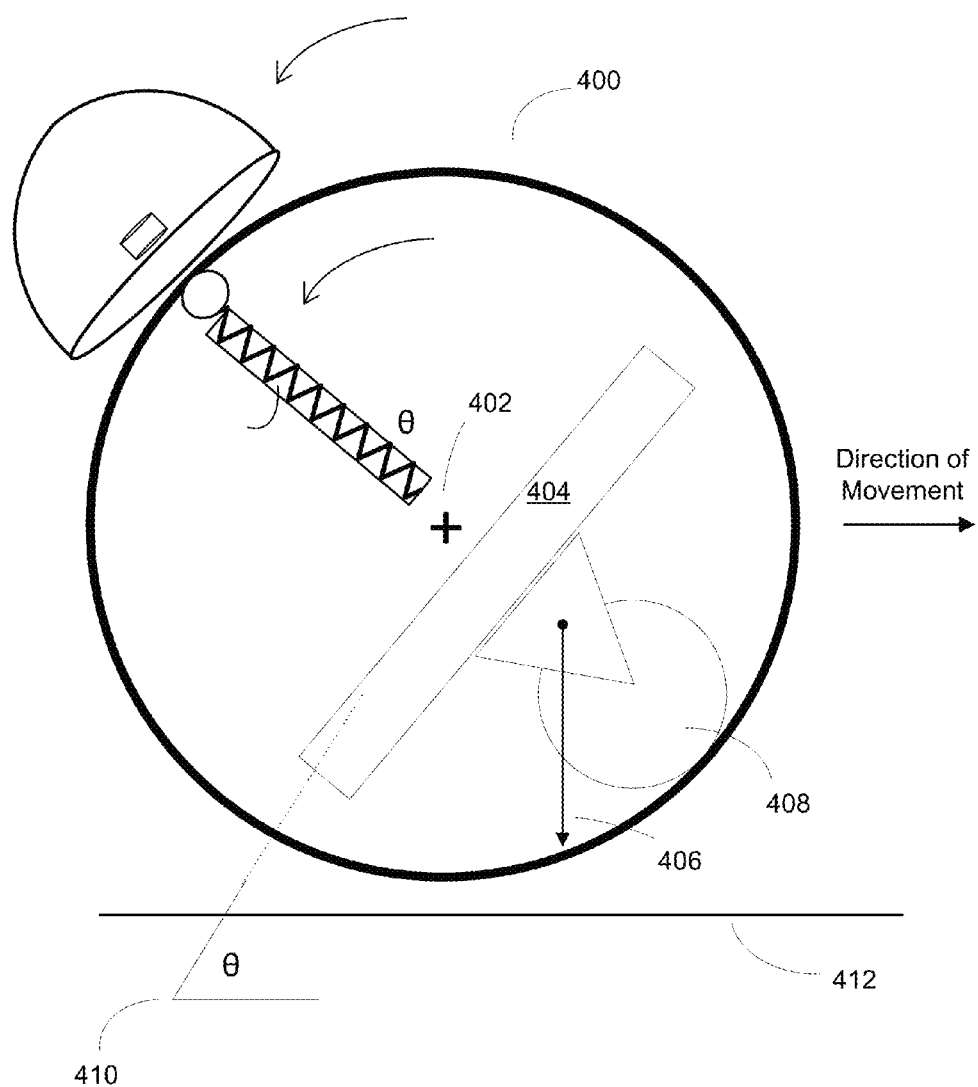
FIG. 4 illustrates an example operation for causing motion of a self-propelled spherical device.

FIG. 4 illustrates an example technique for causing motion of a self-propelled spherical device 400. In the example illustrated by FIG. 4, the self-propelled device 400 is shown, having center of rotation 402 and center of mass 406, and in contact with planar surface 412. The drive mechanism for robotic device 400 can comprises two independently-controlled wheeled actuators 408 in contact with the inner surface of the enclosing spherical envelope of device 400. Also shown is sensor platform 404. Several components of device 400 are not shown in FIG. 4 for simplicity of illustration.

To achieve continuous motion at a constant velocity, the displacement of center of mass 406 relative to center of rotation 402 can be maintained by action of wheeled actuators 408. The displacement of the center of mass 406 relative to center of rotation 402 is difficult to measure, thus it is difficult to obtain feedback for a closed-loop controller to maintain constant velocity. However, the displacement is proportional to the angle 410 (equal to θ) between sensor platform 404 and surface 412. The angle 410 can be sensed or estimated from a variety of sensor inputs. Therefore, as an example, the speed controller for robotic device 400 can be implemented to use angle 410 to regulate speed for wheeled actuators 408 causing device 400 to move at a constant speed across surface 412. The speed controller can determine the desired angle 410 to produce the desired speed, and the desired angle set-point is provided as an input to a closed loop controller regulating the drive mechanism.

FIG. 4 illustrates use of angle measurement for speed control; however the technique can be extended to provide control of turns and rotations, with feedback of appropriate sensed angles and angular rates. It can be seen from the foregoing discussion that knowledge of the orientation angles is useful, in various embodiments, for control of a self-propelled device. Measuring the orientation of the device is also useful for navigation and alignment with other devices.

Hardware Diagram

Figure 5:
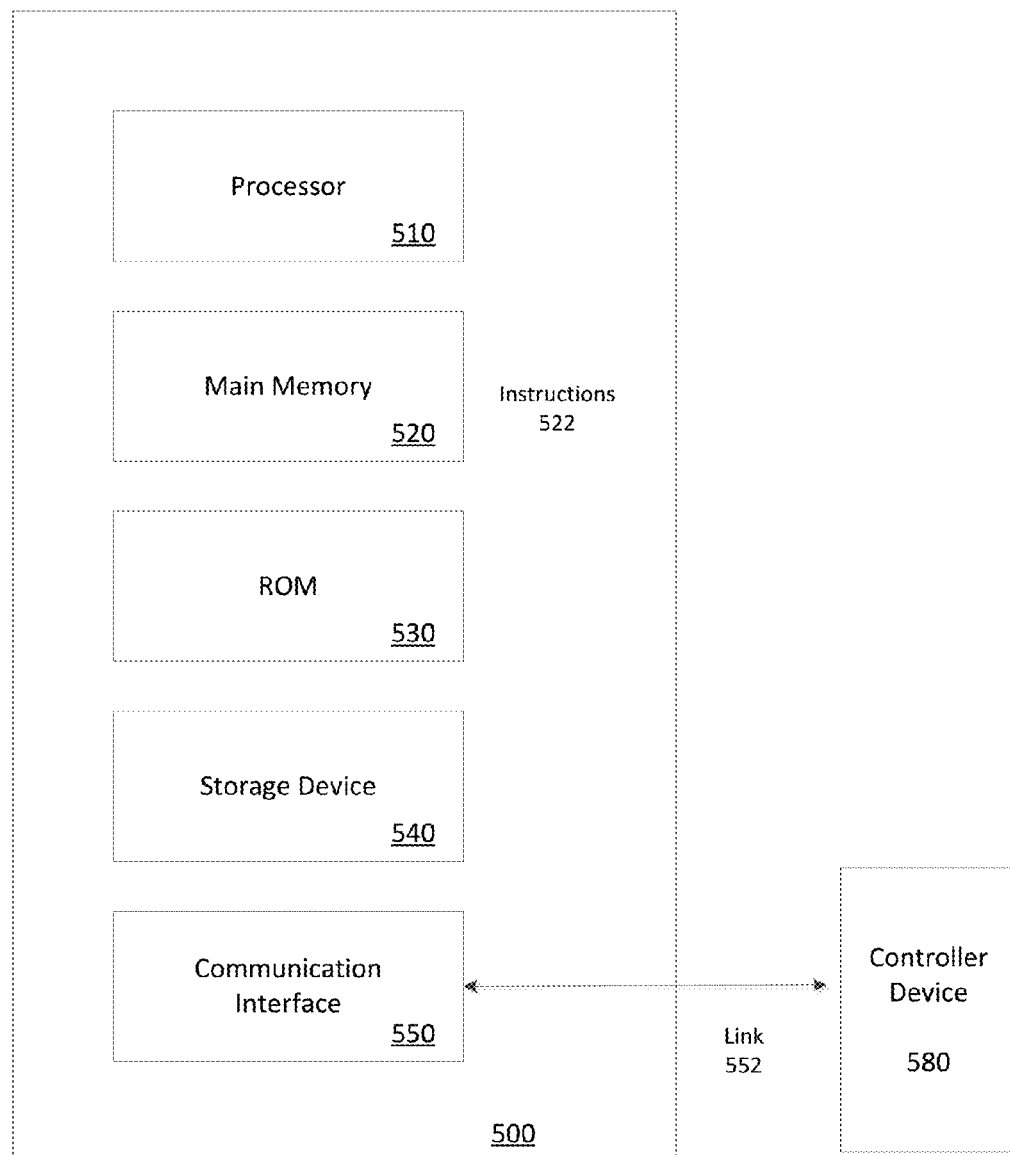
FIG. 5 is an example block diagram illustrating a computer system upon which examples described may be implemented.

FIG. 5 is an example block diagram that illustrates a computer system upon which examples described may be implemented. For example, one or more components discussed with respect to the system 100 of FIG. 1 may be performed by the system 500 of FIG. 5. The system 100 can also be implemented using a combination of multiple computer systems as described by FIG. 5.

In one implementation, the computer system 500 includes processing resources 510, a main memory 520, ROM 530, a storage device 540, and a communication interface 550. The computer system 500 includes at least one processor 510 for processing information and a main memory 520, such as a random access memory (RAM) or other dynamic storage device, for storing information and instructions 522 to be executed by the processor 510. The main memory 520 also may be used for storing temporary variables or other intermediate information during execution of instructions to be executed by the processor 510. The computer system 500 may also include a read only memory (ROM) 530 or other static storage device for storing static information and instructions for the processor 510. A storage device 540, such as a magnetic disk or optical disk, is provided for storing information and instructions. For example, the storage device 540 can correspond to a computer-readable medium that triggers logic for maneuvering the self-propelled device discussed with respect to FIGS. 1-4.

The communication interface 550 can enable computer system 500 to communicate with a controller device 580 via an established network link 552 (wireless or wireline). Using the network link 552, the computer system 500 can receive command instructions for maneuvering the self-propelled device.

Examples described herein are related to the use of computer system 500 for implementing the techniques described herein. According to one example, those techniques are performed by computer system 500 in response to processor 510 executing one or more sequences of one or more instructions contained in main memory 520. Such instructions may be read into main memory 520 from another machine-readable medium, such as storage device 540. Execution of the sequences of instructions contained in the main memory 520 causes processor 510 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art. Accordingly, it is intended that the scope of this disclosure be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

While certain examples have been described above, it will be understood that the examples described are by way of example only. Accordingly, this disclosure should not be limited based on the described examples. Rather, the scope of the disclosure should only be limited in light of the claims that follow when taken in conjunction with the above description and accompanying drawings.

What is claimed is:

1. A self-propelled device comprising:
a spherical housing;
an internal drive system provided within the spherical housing;
a biasing component coupled to the internal drive system to cause a pair of wheels of the internal drive system to continuously engage an inner surface of the spherical housing;
a first magnetic coupling component coupled to the biasing component, the first magnetic coupling component to provide a magnetic field that extends through the spherical housing; and
an accessory device external to the spherical housing and comprising (i) a second magnetic coupling component to magnetically couple with the first magnetic coupling component through the spherical housing, and (ii) a contact surface to engage an exterior surface of the spherical housing.

2. The self-propelled device of claim 1, wherein the first magnetic coupling component and the second magnetic coupling component each comprise one or more magnets.

3. The self-propelled device of claim 1, further comprising:
a wireless communication interface to receive command instructions from a controller device; and
one or more processors to implement the command instructions on the internal drive system to maneuver the self-propelled device.

4. The self-propelled device of claim 3, wherein the command instructions correspond to voice inputs by a user.

5. The self-propelled device of claim 3, wherein the command instructions comprise an instruction to operate autonomously, and wherein the one or more processors execute the instruction to operate the self-propelled device in a full or partial autonomous mode.

6. The self-propelled device of claim 1, wherein the internal drive system comprises a pair of independent motors, each of the pair of independent motors to drive a respective one of the pair of wheels.

7. The self-propelled device of claim 1, further comprising:
a power source; and
an inductive charge port to inductively charge the power source when the self-propelled device is in inductive contact with an external inductive charging device.

8. The self-propelled device of claim 1, wherein the contact surface of the accessory device comprises a radius of curvature substantially equivalent to a radius of curvature of the spherical housing.

9. A system comprising:
a controller device; and
a self-propelled device in wireless communication with the controller device, the self-propelled device comprising:
a spherical housing;
an internal drive system provided within the spherical housing;
a biasing component coupled to the internal drive system to cause a pair of wheels of the internal drive system to continuously engage an inner surface of the spherical housing;
a first magnetic coupling component coupled to the biasing component, the first magnetic coupling component to provide a magnetic field that extends through the spherical housing; and
an accessory device external to the spherical housing and comprising (i) a second magnetic coupling component to magnetically couple with the first magnetic coupling component through the spherical housing, and (ii) a contact surface to engage an exterior surface of the spherical housing.

10. The system of claim 9, wherein the first magnetic coupling component and the second magnetic coupling component each comprise one or more magnets.

11. The system of claim 9, wherein the internal drive system comprises a pair of independent motors, each of the pair of independent motors to drive a respective one of the pair of wheels.

12. The system of claim 9, wherein the self-propelled device further comprises:
a power source; and
an inductive charge port to inductively charge the power source when the self-propelled device is in inductive contact with an external inductive charging device.

13. The system of claim 9, wherein the contact surface of the accessory device comprises a radius of curvature substantially equivalent to a radius of curvature of the spherical housing.

14. The system of claim 9, wherein the controller device comprises one of a smart phone or a tablet computer.

15. The system of claim 14, wherein the controller device executes an application program to establish a wireless connection with the self-propelled device.

16. The system of claim 15, wherein the wireless connection comprises a BLUETOOTH connection.

17. The system of claim 15, wherein the self-propelled device further comprises:
a wireless communication interface to receive command instructions from the controller device over the wireless connection; and
one or more processors to implement the command instructions on the internal drive system to maneuver the self-propelled device.

18. The system of claim 17, wherein the command instructions correspond to voice commands received by the controller device from a user.

19. The system of claim 17, wherein the command instructions comprise an instruction to operate autonomously, and wherein the one or more processors execute the instruction to operate the self-propelled device in a full or partial autonomous mode.

20. The system of claim 17, wherein the command instructions correspond to motion input based on a user moving the controller device.

* * * * *